United States Patent [19]

Umezaki

[11] Patent Number: 4,765,761
[45] Date of Patent: Aug. 23, 1988

[54] WATER PUMP BEARING UNIT

[75] Inventor: Kazuyuki Umezaki, Osaka, Japan

[73] Assignee: Koyo Seiko Co., Ltd., Osaka, Japan

[21] Appl. No.: 44,946

[22] Filed: Apr. 30, 1987

[30] Foreign Application Priority Data

May 1, 1986 [JP] Japan ............................... 61-67203[U]

[51] Int. Cl.⁴ .......................... F16C 33/78; F16J 15/32
[52] U.S. Cl. .................................... 384/484; 277/152;
277/208; 384/486
[58] Field of Search ........ 384/477, 481, 482, 484–486;
277/152, 206 R, 208

[56] References Cited

U.S. PATENT DOCUMENTS

| | | | |
|---|---|---|---|
| 2,878,084 | 3/1959 | Bermingham | 384/486 |
| 3,423,140 | 1/1969 | Cowles | 384/486 |
| 3,601,457 | 8/1971 | Helms | 384/485 |
| 3,796,510 | 3/1974 | Korrenn et al. | 384/477 X |
| 3,858,950 | 1/1975 | Otto | 384/485 |
| 4,155,560 | 5/1979 | Repella | 277/208 X |
| 4,526,485 | 7/1985 | Frase et al. | 384/486 |

Primary Examiner—Stuart S. Levy
Assistant Examiner—Thomas R. Hannon
Attorney, Agent, or Firm—Finnegan, Henderson, Farabow, Garrett and Dunner

[57] ABSTRACT

A water pump bearing unit for satisfactorily sealing an impeller side of the pump comprises a plurality of rollers installed in the annular space between a water pump shaft and a pulley respectively on one and the other ends thereof and an outer ring surrounding the shaft; an annular seal member with two lips, each having an interference, inwardly and outwardly extended in the axial direction between the end of the outer ring on the impeller side and the outer peripheral surface of the shaft; and an annular seal member with a lip having an interference inwardly extended in the axial direction between the end of the outer ring on the pulley side and the outer peripheral surface of the shaft.

2 Claims, 2 Drawing Sheets

WATER PUMP BEARING UNIT

FIELD OF THE INVENTION

The present invention relates to a novel water pump bearing unit structure which prevents foreign substances from entering the water pump bearing unit.

BACKGROUND OF THE INVENTION

The present invention relates to a water pump bearing.

A conventional water pump bearing unit as shown in FIG. 4 (Utility Model Application (OPI) No. 172116/83) is equipped with an impeller on one end of a water pump shaft 1 and a pulley on the other. An outer ring 2 is arranged around the outer periphery of the shaft 1 between the impeller and the pulley. A plurality of balls 3, are located in the annular space between the shaft 1 and the outer ring 2 on the impeller side and a plurality of rollers 5, are located on the pulley side. Moreover, the outer peripheries 7a of seal members 7 are fitted to annular stepped portions 6 provided on the inner peripheral surfaces 2a of both ends of the outer ring 2, respectively. Further, bidirectional seal lips 7b-1, 7b-2 are formed on the inner peripheries 7b of the seal members 7 extend back and forth in the axial direction so as to rub the outer peripheral surface 1a of the shaft 1. The seal members 7 are used as bidirectional seals on both sides of the outer ring 2 in the axial direction.

The difficulty with the aforesaid conventional water pump bearing unit is if the pressure in the annular space changes such that the temperature drops while the water pump stops operating, both the seal members 7 change negatively because of volumetric change of a grease or air in the space thus the negative pressure state is maintained because toth the seal members 7 have bidirectional sealing properties. As a consequence, water may enter the water pump bearing unit through the contact between the seal member 7 on the impeller side and the shaft 1. The foreign substance causes grease to deteriorate and permits not only seizing but also rust generation therein.

SUMMARY OF THE INVENTION

An object of the present invention is to provide a water pump bearing unit which prevents foreign substance such as water, from entering therein. This is achieved by supplying air from the pulley of the water pump bearing unit at the point when the pressure between both the annular seal members changes negatively and the water pump stops operating.

In order to accomplish the aforesaid objects, the water pump bearing unit according to the present invention comprises, as shown in FIG. 1, a plurality of rolling elements 14, 15 installed in between a water pump shaft 11 having an impeller and a pulley respectively on one and the other ends thereof and an outer ring 12 surrounding the shaft 11; a seal member 21 with two lips 23, 24, each having an interference inwardly and outwardly extended in the axial direction between the end of the outer ring 12 on the impeller side and the outer peripheral surface 11c of the shaft 11, the seal member 21 having bidirectional sealing properties; and a seal member 31 with a lip 33 having an interference inwardly extended in the axial direction between the end of the outer ring 12 on the pulley side and the outer peripheral surface 11c of the shaft 11, the seal member 31 having unidirectional sealing properties.

When the water pump operates, the pressure in the space 40 between both the seal members 21, 31 where the rolling elements 14, 15 are disposed is positively elevated. For this reason, the seal members 21, 31 on the impeller and pulley sides are pressed from the inside to outside in the axial direction. The straining force of the inside lip 23 in the seal member 21 on the impeller side increases, whereas the straining force of the lip 33 in the seal member 31 on the pulley side increases, so that the leakage of grease as well as the infiltration of water is prevented. When the water pump stops operating, the air and grease temperatures in the aforesaid space 40 drop, causing their volumes to decrease. Consequently, the pressure is negatively effected in the space, thus pushing both the seal members 21, 31 from the outside to inside. Then the outer lip 24 of the seal member 21 on the impeller side having the bidirectional sealing properties is strongly pressed against the outer peripheral surface 11c of the shaft 11, so that the outer lip 24 works to seal the inside. Because the straining force of the lip 33 of the seal member 31 on the pulley side has unidirectional sealing properties the inside to outside is weakened by pushing said seal member 31. The air is consequently led from the outside into the space 40 between both the seal members 21, 31 through the gap between the lip 33 and the outer peripheral surface 11c of the shaft 11. Accordingly, the air pressure in the space 40 is caused to rise and thus prevent the entry of water or the like from the impeller side because of the negative pressure therein. When the pressure inside the space 40 reaches the atmospheric pressure, the enclosure is sealed by both the seal members 21, 31.

BRIEF DESCRIPTION OF THE DRAWINGS

The accompanying drawings, which are incorporated in and constitute a part of the specification, illustrate one embodiment of the invention and together with the description, serve to explain the principles of the invention.

PREFERRED EMBODIMENTS OF THE INVENTION

Referring now to the accompanying drawings, a detailed description will be given of an embodiment of the present invention.

Figure 1:
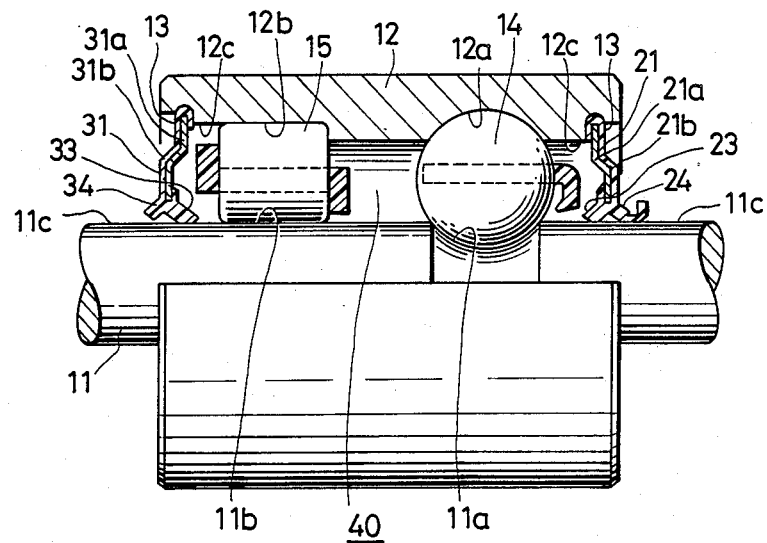
FIG. 1 is a sectional view of an embodiment of the present invention.
Figure 4:
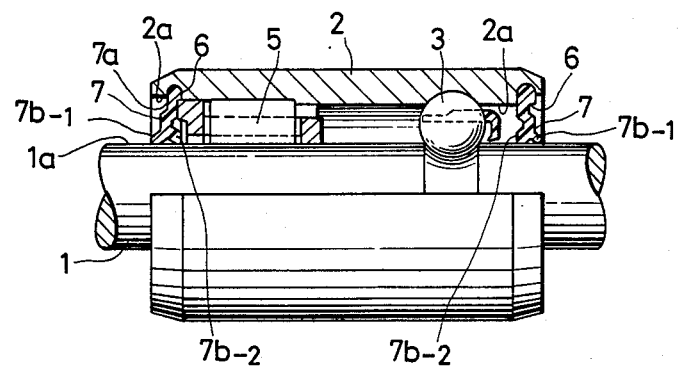
FIG. 4 is a sectional view of a conventional water pump bearing unit.

FIG. 1 is a sectional view of a water pump bearing unit embodying the present invention. FIG. 1 shows, there is a water pump bearing unit comprising a water pump shaft 11 equipped with an impeller (not shown) on the right-hand end of the shaft 11 and a pulley (not shown) on the left-hand end thereof; a cylindrical outer ring 12 arranged on the outer periphery of the shaft 11, annular stepped portions 13 being formed on the inner peripheral surfaces 12c at both ends of the outer ring 12; a plurality of rolling elements or balls 14 disposed in the annular space between the raceway surface 11a of the shaft 11 and that 12a of the outer ring 12 along their peripheral direction; a plurality of rolling elements or rollers 15 disposed in the annular space between the raceway surface 11b of the shaft 11 and that 12b of the outer ring 12 along their peripheral direction, the rollers 15 being positioned closer than the balls 14 to the pulley; an annular seal member 21 on the impeller side composed of a core metal 21a and rubber 21b; an annular seal member 32 on the pulley side composed of a core metal 31a and rubber 31b.

Figure 2:
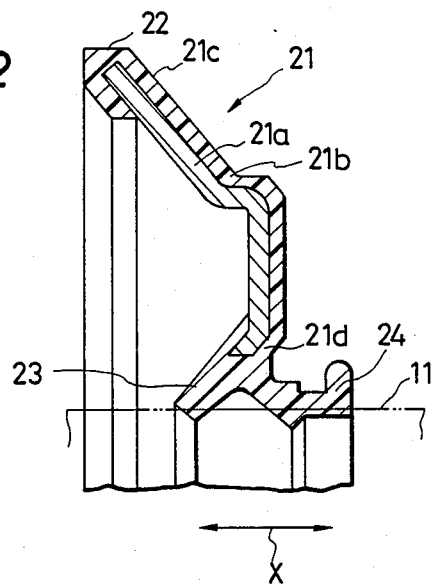
FIG. 2 is a sectional view of the principal part of a seal member on the impeller side of the embodiment thereof.

As shown in FIG. 2, on the outer periphery 21c of the annular seal member 21 on the impeller side, a fitting portion 22 is formed and on the inner periphery 21d of the annular seal member 21 an inner lip 23 and an outer lip 24 in the form of a fork are built, the inner and outer lips 23, 24 being made of rubber. The inner lip 23 is also so shaped as to diagonally inwardly extend to the axial direction X, whereas the outer lip 24 is so shaped in a bulbous fashion as to diagonally outwardly extend to the axial direction X. The inner and outer lips 23, 24 of the annular seal member 21 provide the shaft 11 bidirectional straining and sealing properties. Interferences are respectively provided for the inner and outer lips 23, 24 relative to the outer peripheral surface 11c of the shaft 11 while the fitting portion 22 of the seal member 21 is fitted to the annular stepped portion 13 on one side of the outer ring 12. The outer lip 24 is so arranged as to have a larger transverse sectional area, whereby it can stick to the outer peripheral surface 11c of the shaft 11 with an increase straining force.

Figure 3:
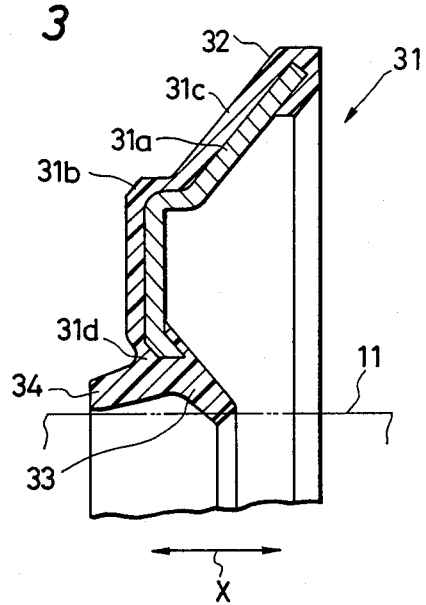
FIG. 3 is a sectional view of the principal part of a seal member on the pulley side of the embodiment thereof.

As shown in FIG. 3, on the outer periphery of the annular seal member 31 on the pulley side a fitting portion 32 is formed, whereas an inner lip 33 and an outer lip 34 in the form of a fork are built on the inner periphery of the annular seal member 31, the inner and outer lips 33, 34 being made of rubber. The inner and outer lips 33, 34 are also so arranged as to inwardly and outwardly extend to the axial direction X, respectively. An interference is provided for the inner lip 33 relative to the outer peripheral surface 11c of the shaft 11 while the fitting portion 32 of the annular seal member 31 is fitted to the annular stepped portion 13 of the other side of the outer ring 12, whereas the outer lip 34 is dimensionally so arranged as to provide a small gap relative to the outer peripheral surface 11c of the shaft 11. Consequently, the inner lip 33 of the annular seal member 31 is made to have straining properties from the inside to outside and unidirectional sealing properties from the inside to outside.

As shown in FIG. 1, thermal expansion during the operation of the water pump causes the air and grease pressure in the annular space 40 where the ball 14 and the roller 15 are disposed to. The annular seal member 21 on the impeller side presses from the inside against outside in the axial direction and a double interference ensues by the inner and outer lips 23, 24 relative to the shaft 11. However, because the lips 23, 24 are pressed from the inside against outside in the axial direction, the inner lip 23 particularly offers greater straining force toward the outer peripheral surface 11c of the shaft 11. Moreover, the annular seal member 31 on the pulley side is pressed from the inside against outside in the axial direction an the inner lip 33 is also axially outwardly moved and caused to offer greater straining force. Both the annular seal members 21, 31 ensures that the internal annular space 40 is closed to the outside, thus preventing grease and water from leaking out and in, respectively.

Once the operation of the water pump is stopped, the grease and air temperatures in the aforesaid annular space 40 drops or the air pressure becomes negative. Thereafter both the annular seal members 21, 31 are pushed from the outside to inside. At this time, the inner lip 33 of the annular seal member 31 on the pulley side is axially inwardly moved while its outer lip 34 still has a small gap relative to the outer peripheral surface 11c of the shaft 11 and the latter allows a gap to remain or the interference to decrease. Accordingly, the air penetrates into the space 40 from the outside through the gap between the inner and outer lips 33, 34 of the annular seal member 31 and the outer peripheral surface 11c of the shaft 11. The air pressure in the space 40 instantly changes from negative to positive one. No water is therefore allowed to enter the space 40 from the outside through the gap between the annular seal member 21 on the impeller side and the shaft 11. As water is scarce on the pulley sice, no water is caused to enter the space 40 though the air is led in from the pulley side. Therefore, practically no problem is posed. Although the annular seal member 31 on the pulley side is provided with the inner and outer lips 33, 34 and the outer lip 34 employed as a labyrinth seal, only the inner lip 33 without the outer lip 34 may be used for sealing purposes.

As set forth above, the water pump bearing unit according to the present invention comprises the annular seal member with two lips, each having an interference, inwardly and outwardly extended in the axial direction between the end of the outer ring on the impeller side and the outer peripheral surface of the shaft, the annular seal member having bidirectional sealing properties; and an annular seal member with a lip having an interference inwardly extended in the axial direction between the end of the outer ring on the pulley side and the outer peripheral surface of the shaft, the annular seal member having unidirectional sealing properties. Accordingly, the bidirectional sealing properties of the annular seal member on the impeller side make it possible to satisfactorily seal the impeller side of the pump even through the pressure between both the annular seal members becomes negative or positive on the impeller side and, because air is introduced into the annular space between both the annular seal members from the pulley side where water is scarce, through the unidirectional annular seal member, even though the pressure between both the annular seal members becomes negative, the grease and water are prevented from leak out or in on the impeller side.

Other embodiments of the invention will be apparent to those skilled in the art from consideration of the specification and practice of the invention disclosed herein. It is intended that the specification and examples be considered as exemplary only, and that the true scope and spirit of the invention being indicated by the following claims.

What is claimed is:

1. In a water pump bearing unit having a water pump shaft extending from a first end of the unit to a second end of the unit, and an impeller proximate the first end and a pulley proximate the second end, a sealing arrangement comprising:

an outer ring surrounding the shaft, to form an internal annular space;

a plurality of roller elements in said internal annular space;

a first annular seal member, operating as a bidirectional seal, located between the pump shaft and said outer ring at said first end of the bearing unit, said first annular seal member having a first inwardly extending lip for sealing said internal annular space at the first end of the bearing unit when the pressure in said internal annular space is higher than the external pressure at the first end and a first outwardly extending lip for sealing said internal annular space at the first end of the bearing unit when the pressure in said internal annular space is less than the external pressure at the first end; and, a second annular seal member, operating as a unidirectional seal, located between the pump shaft and said outer ring at said second end of the bearing unit, said second annular seal member having a second inwardly extending lip for sealing said internal annular space at the second end of the bearing unit when the pressure of said internal annular space is higher than the external presure at the second end and a second outwardly extending lip for allowing air penetration into the internal annular space when the pressure in said internal annular space is less than the external pressure of the first end.

2. A water pump bearing unit according to claim 1, wherein:

said first inwardly and outwardly extending lips of said first annular seal member are approximately formed at a 90° angle from one another; and said second inwardly extending lip of said second annular seal member is formed in such a manner as to enable a substantial portion of its length to interfere with the pump shaft member.

* * * * *